(12) United States Patent
Takebayashi et al.

(10) Patent No.: US 11,866,828 B2
(45) Date of Patent: Jan. 9, 2024

(54) PLATED STEEL SHEET FOR HOT STAMPING

(71) Applicant: NIPPON STEEL CORPORATION, Tokyo (JP)

(72) Inventors: Hiroshi Takebayashi, Tokyo (JP); Kojiro Akiba, Tokyo (JP); Akihiro Sengoku, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/796,057

(22) PCT Filed: Mar. 9, 2021

(86) PCT No.: PCT/JP2021/009266
§ 371 (c)(1),
(2) Date: Jul. 28, 2022

(87) PCT Pub. No.: WO2021/182465
PCT Pub. Date: Sep. 16, 2021

(65) Prior Publication Data
US 2023/0073024 A1    Mar. 9, 2023

(30) Foreign Application Priority Data
Mar. 12, 2020 (JP) ................. 2020-042521

(51) Int. Cl.
| | | |
|---|---|---|
| *C23C 2/06* | (2006.01) | |
| *C23C 2/28* | (2006.01) | |
| *C23C 2/40* | (2006.01) | |
| *B32B 15/01* | (2006.01) | |
| *B21D 22/02* | (2006.01) | |
| *B21D 22/20* | (2006.01) | |
| *C23C 2/20* | (2006.01) | |
| *C23C 2/26* | (2006.01) | |
| *C22C 18/04* | (2006.01) | |
| *C23C 28/00* | (2006.01) | |
| *C23C 30/00* | (2006.01) | |
| *B32B 15/04* | (2006.01) | |
| *C23C 28/02* | (2006.01) | |
| *B32B 15/18* | (2006.01) | |

(52) U.S. Cl.
CPC .............. *C23C 2/06* (2013.01); *B21D 22/022* (2013.01); *B21D 22/20* (2013.01); *B32B 15/013* (2013.01); *B32B 15/04* (2013.01); *B32B 15/043* (2013.01); *B32B 15/18* (2013.01); *C22C 18/04* (2013.01); *C23C 2/20* (2013.01); *C23C 2/26* (2013.01); *C23C 2/261* (2022.08); *C23C 2/28* (2013.01); *C23C 2/285* (2013.01); *C23C 2/29* (2022.08); *C23C 2/40* (2013.01); *C23C 28/023* (2013.01); *C23C 28/025* (2013.01); *C23C 28/30* (2013.01); *C23C 28/321* (2013.01); *C23C 28/3225* (2013.01); *C23C 28/34* (2013.01); *C23C 28/345* (2013.01); *C23C 30/00* (2013.01); *C23C 30/005* (2013.01); *Y10T 428/1266* (2015.01); *Y10T 428/12611* (2015.01); *Y10T 428/12618* (2015.01); *Y10T 428/12667* (2015.01); *Y10T 428/12799* (2015.01); *Y10T 428/12951* (2015.01); *Y10T 428/12958* (2015.01); *Y10T 428/12972* (2015.01); *Y10T 428/2495* (2015.01); *Y10T 428/24967* (2015.01); *Y10T 428/26* (2015.01); *Y10T 428/265* (2015.01); *Y10T 428/27* (2015.01)

(58) Field of Classification Search
CPC ... C23C 28/023; C23C 28/025; C23C 28/321; C23C 28/3225; C23C 28/30; C23C 28/34; C23C 28/345; C23C 30/00; C23C 30/005; C23C 2/06; C23C 2/20; C23C 2/261; C23C 2/28; C23C 2/29; C23C 2/40; C23C 2/26; C23C 2/285; B21D 22/022; B21D 22/20; B32B 15/013; B32B 15/04; B32B 15/043; B32B 15/18; C22C 18/04; Y10T 428/12611; Y10T 428/12618; Y10T 428/1266; Y10T 428/12667; Y10T 428/12799; Y10T 428/12951; Y10T 428/12958; Y10T 428/12972; Y10T 428/2495; Y10T 428/24967; Y10T 428/26; Y10T 428/27; Y10T 428/265
See application file for complete search history.

(56) References Cited

U.S. PATENT DOCUMENTS

| | | |
|---|---|---|
| 2008/0075970 A1 | 3/2008 | Suzuki et al. |
| 2014/0342181 A1* | 11/2014 | Mutschler ............ C21D 1/26 148/533 |
| 2015/0307977 A1 | 10/2015 | Sohn et al. |

FOREIGN PATENT DOCUMENTS

| | | |
|---|---|---|
| JP | 2003-126921 A | 5/2003 |
| JP | 2005-240072 A | 9/2005 |
| JP | 2006-22395 A | 1/2006 |
| JP | 2007-182608 A | 7/2007 |
| JP | 2011-117086 A | 6/2011 |
| WO | WO 2015/007723 A1 | 1/2015 |

* cited by examiner

*Primary Examiner* — Michael E. La Villa
(74) *Attorney, Agent, or Firm* — Birch, Stewart, Kolasch & Birch, LLP

(57) ABSTRACT

A plated steel sheet for hot stamping including a base metal and a galvanized layer that is formed on a surface of the base metal, wherein the galvanized layer includes a galvannealed layer, a solidified zinc layer, and an oxide layer containing Al, in this order from the base metal, and a proportion of a content of Zn ($g/m^2$) in the solidified zinc layer to a content of Zn ($g/m^2$) in the galvanized layer is 10 to 95%.

8 Claims, No Drawings

PLATED STEEL SHEET FOR HOT STAMPING

TECHNICAL FIELD

The present invention relates to a plated steel sheet for hot stamping.

BACKGROUND ART

Various automobile components constituting an automobile body are required to have various performances in accordance with usages of the components. For automobile components such as an A-pillar reinforcement, a B-pillar reinforcement, a bumper reinforcement, a tunnel reinforcement, a side sill reinforcement, a roof reinforcement, and a floor cross member, for example, only a specific region of each of the automobile components is required to have a strength higher than a strength at general regions other than the specific region. Thus, there has been in part employed a technique in which hot stamping forming is performed on an automobile component at only a portion corresponding to the specific region that needs to be reinforced to produce a hot stamped member.

At this time, if a cold-rolled steel sheet that is not subjected to surface treatment is used, iron oxide scales are produced on a surface of the steel sheet in heating. The oxide scales not only peel off in formation, leading to a wear on a press tooling, but also cause a defect on the surface of the steel sheet. In addition, if the oxide scales are left on the surface of the steel sheet after the formation, the oxide scales may cause poor welding in a welding process performed thereafter or poor adhesiveness of coating in a coating process performed thereafter.

Thus, to prevent oxide scales from being produced, a zinc-based plated steel sheet or the like can be used, as described in Patent Document 1. By using a zinc-based plated steel sheet, oxidation of iron is prevented by a small amount of zinc being oxidized prior to iron, so that weldability and paintability can be significantly improved.

Further, even these components have recently been required to have corrosion resistance; for example, according to Patent Documents 2 to 5, techniques for enhancing corrosion resistance by increasing a weight per square meter of plating adhering to a steel sheet before heating to cause plating having a content of Zn of about 70% with the balance being mainly Fe to remain on a surface of the plating after the heating have been developed.

LIST OF PRIOR ART DOCUMENTS

Patent Document

Patent Document 1: JP2003-126921A
Patent Document 2: JP2005-240072A
Patent Document 3: JP2006-022395A
Patent Document 4: JP2007-182608A
Patent Document 5: JP2011-117086A

SUMMARY OF INVENTION

Technical Problem

In a case where formation of a plating layer is performed through a continuous line, it is necessary for a plating bath to contain a small amount of Al to prevent excessive alloying by Zn in the plating bath from reacting with Fe in base metal. In particular, when an Al-containing Zn plating of a heavy coating weight per square meter is used, a cobweb-like surface defect may occur after heating and formation. The cobweb-like surface defect is a projecting defect, which is undesirable in quality because the cobweb-like surface defect is relieved against a surface even after coating for an automobile is applied.

It is therefore necessary to prevent the cobweb-like defect. The fact is, however, that neither a mechanism by which the cobweb-like defect occurs nor a method for preventing the cobweb-like defect has been known.

An objective of the present invention is to solve the problems described above and to provide a plated steel sheet for hot stamping on which a cobweb-like surface defect can be prevented in a case where Al-containing Zn plating is used.

Solution to Problem

The present invention has been made to solve the problems described above, and the gist of the present invention is the plated steel sheet for hot stamping.

(1) A plated steel sheet for hot stamping including a base metal and a galvanized layer that is formed on a surface of the base metal, wherein the galvanized layer includes a galvannealed layer, a solidified zinc layer, and an oxide layer containing Al, in this order from the base metal, and a proportion of a content of Zn ($g/m^2$) in the solidified zinc layer to a content of Zn ($g/m^2$) in the galvanized layer is 10 to 95%.

(2) The plated steel sheet for hot stamping according to (1) above, wherein a chemical composition of the oxide layer satisfies Formula (i) shown below.

$$3.0 \leq Zn/Al \leq 6.0 \tag{i}$$

where Zn and Al are contents of Zn and Al ($g/m^2$) contained in the oxide layer, respectively.

(3) The plated steel sheet for hot stamping according to (1) or (2) above, wherein an average thickness of the oxide layer is 1.0 μm or less.

(4) The plated steel sheet for hot stamping according to any one of (1) to (3) above, wherein the content of Zn in the galvanized layer is 65 to 150 $g/m^2$.

(5) The plated steel sheet for hot stamping according to any one of (1) to (4) above, wherein a content of Fe in the galvanized layer is, in mass %, less than 7%.

Advantageous Effects of Invention

According to the present invention, it is possible to provide a plated steel sheet for hot stamping on which a cobweb-like surface defect can be prevented in a case where Al-containing Zn plating is used.

DESCRIPTION OF EMBODIMENTS

The present inventors investigated what causes the cobweb-like surface defect and obtained the following findings.

(a) In a case where Al is contained in a plating bath, a thin oxide layer containing Al is formed on a surface of a resultant plating layer. In particular, in a case where a weight per square meter of the plating is heavy, the plating layer turns into a liquid phase and moves by heating in hot stamping, and a stress caused by the movement produces fine cracking in the oxide layer.

(b) Zn, Mn, and the like in the plating flow into gaps formed by the cracking in the oxide layer, and the gaps are filled with oxides of Zn, Mn, and the like to form a cobweb-like pattern, resulting in a deterioration in surface texture.

The present inventors conducted intensive studies about how to prevent cracking in the oxide layer and further obtained the following findings.

(c) It is possible to prevent the liquid phase of the plating from moving by alloying the plating layer moderately to form a galvannealed layer to control a proportion of the solidified zinc layer formed in a layer over the galvannealed layer.

(d) Further, by reforming the oxide layer to relatively increase a content of Zn with respect to a content of Al in the oxide layer, the oxide layer is softened to further resist cracking.

(e) For the reforming of the oxide layer, optimization of wiping conditions is effective.

The present invention is made based on the findings described above. Respective requirements of the present invention will be described below in detail.

(A) General Configuration

A plated steel sheet for hot stamping according to an embodiment of the present invention includes a base metal and a galvanized layer that is formed on a surface of the base metal. A configuration of the galvanized layer will be described in detail.

(B) Galvanized Layer

In the present invention, the galvanized layer includes a galvannealed layer, a solidified zinc layer, and an oxide layer containing Al, in this order from the base metal. A coating weight per square meter of the galvanized layer is not limited to a particular coating weight per square meter but can be set to 30 to 180 $g/m^2$ in terms of the content of Zn. Corrosion resistance is enhanced with an increase in the coating weight per square meter.

In addition, a cobweb-like surface defect is more prone to appear with an increase in the coating weight per square meter. Accordingly, advantageous effects of the present invention are exerted pronouncedly when the coating weight per square meter of the galvanized layer is 65 $g/m^2$ or more in terms of the content of Zn. On the other hand, from a viewpoint of preventing the cobweb-like surface defect, the coating weight per square meter of the galvanized layer is preferably 150 $g/m^2$ or less in terms of the content of Zn.

To produce a normal galvannealed steel sheet, the galvanized layer needs to be alloyed completely; therefore, a content of Fe in the galvanized layer is 7% or more. In contrast, in the present invention, the galvanized layer is not alloyed completely, as will be described later. Accordingly, an average content of Fe in the entire galvanized layer is preferably, in mass %, less than 7%, more preferably 6% or less.

(C) Galvannealed Layer

The galvannealed layer is a layer that is formed as intermetallic compounds produced by a reaction between Zn in the plating bath and Fe in the base metal. The galvannealed layer formed in a moderate amount enables controlling of a proportion of the solidified zinc layer described below, so as to prevent a liquid phase of the plating from moving in hot stamping.

(D) Solidified Zinc Layer

The solidified zinc layer is a layer in which a hot-dip galvanizing bath is solidified and is normally called 11 layer. In the present invention, a proportion of a content of Zn ($g/m^2$) in the solidified zinc layer is set to 10 to 95% with respect to a content of Zn ($g/m^2$) in the galvanized layer.

In a case where a normal, galvanized steel sheet that is produced through a continuous line and not alloyed, Al contained in a plating bath prevents the reaction between Zn in the plating bath and Fe in the base metal. As a result, most of the galvanized layer is constituted by the solidified zinc layer; for example, a proportion of a content of Zn in the solidified zinc layer is more than 95%.

As described above, in the case where the coating weight per square meter is heavy, the solidified zinc layer turns into a liquid phase and moves by heating in hot stamping; therefore, in the present invention, the proportion of the solidified zinc layer is moderately reduced. Specifically, the movement of the liquid phase can be prevented by setting the proportion of the content of Zn in the solidified zinc layer to 95% or less with respect to the content of Zn in the galvanized layer. To prevent the movement of the liquid phase of the plating, the proportion of the content of Zn in the solidified zinc layer is preferably 85% or less or 75% or less, more preferably 65% or less or 55% or less.

In contrast, in a case of a normal galvannealed steel sheet, its galvanized layer is completely alloyed into a galvannealed layer. That is, a proportion of a content of Zn in a solidified zinc layer of the galvannealed steel sheet is almost 0%. However, extremely decreasing the proportion of the solidified zinc layer results in degradation in corrosion resistance. It is thus necessary in the present invention to set the proportion of the content of Zn in the solidified zinc layer to 10% or more with respect to the content of Zn in the entire galvanized layer. In order not to degrade a corrosion resistance of the galvanized layer, the proportion of the content of Zn in the solidified zinc layer is preferably 20% or more, more preferably 30% or more.

(E) Oxide Layer

On a surface of the galvanized layer, an oxide layer containing Al is formed. The oxide layer containing Al is relatively hard, and thus if the solidified zinc layer turns into a liquid phase and moves in heating, there is a risk that cracking may occur.

As described above, decreasing the proportion of the solidified zinc layer prevents the liquid phase of the plating from moving, thus enabling the prevention of cracking. In addition, by softening the oxide layer, the occurrence of cracking can be prevented more effectively. To this end, relatively concentrating Zn in the oxide layer to bring a value of Zn/Al to 3.0 or more is effective. Further, by bringing the value of Zn/Al to 6.0 or less, a ratio of Zn-based oxides can be prevented from increasing excessively, so that excellent adhesiveness of paint is obtained in performing coating with the paint for an automobile or the like after hot stamping. It is therefore preferable that a chemical composition of the oxide layer satisfies Formula (i) shown below.

$$3.0 \leq Zn/Al \leq 6.0 \tag{i}$$

where Zn and Al are contents of Zn and Al ($g/m^2$) contained in the oxide layer, respectively.

Further, an average thickness of the oxide layer is preferably 1.0 μm or less. By setting the average thickness to 1.0 μm or less, a rigidity of the oxides becomes low, so that the oxides are pulverized finely, so as not to produce large, distinct cracking even if the movement of the plating bath occurs; therefore, a distinct cobweb-like defect can be prevented. The average thickness of the oxide layer is more preferably 0.8 μm or less, still more preferably 0.6 μm or less.

It is not necessary to put a lower limit on the average thickness of the oxide layer because it is desirable that the average thickness be as small as possible. However, in a case where Al is contained in the plating bath, the formation of the oxide layer is unavoidable as described above, and thus the average thickness of the oxide layer is practically more than 0 μm.

(F) Measurement Method

In the present invention, chemical compositions, thicknesses, and the like of the entire galvanized layer and each layer of the galvanized layer are to be measured by the following procedure.

First, only the oxide layer is dissolved by immersing the plated steel sheet in a 10% chromic acid aqueous solution. Then, ICP atomic emission spectroscopy is performed on the resultant solution to measure contents of Al and Zn, which are taken as contents of Al and Zn in the oxide layer.

Next, the plated steel sheet is subjected to constant-current electrolysis in an aqueous solution of 150 g/L ammonium chloride at 4 mA/cm$^2$. At this time, a silver-silver chloride electrode is used as a reference electrode. Then, the ICP atomic emission spectroscopy is performed on a solution of the plated steel sheet dissolved at −0.95 V or less to measure a content of Zn in the solidified zinc layer.

Subsequently, the residual plating layer is subjected to constant-current electrolysis until the potential becomes constant near −0.5V, which is a potential of a base metal steel sheet. Then, the ICP atomic emission spectroscopy is performed on the solution obtained in the constant-current electrolysis to measure a content of Zn, which is taken as a content of Zn in the galvannealed layer.

In addition, a galvanized layer of another piece cut from the plated steel sheet at a position adjacent to the sample is totally dissolved in 10% hydrochloric acid aqueous solution with an inhibitor such as IBIT 700BK from Asahi Chemical Co., Ltd. ICP atomic emission spectroscopy is performed on the resultant solution to measure contents of Zn, Al, and Fe, by which a content of Fe in the entire galvanized layer is determined.

Further, another adjacent piece of the plated steel sheet is subjected to a glow discharge optical emission spectrometry (GDS) for analysis of components, in which sputtering is performed in a depth direction from its surface, by which a density profile of Al is obtained. Then, ½ of a depth at which the density of Al determined from the surface first falls below 0.1 mass % is defined as a thickness of the oxide layer. An apparatus for the measurement is, for example, GDA-750 from Rigaku Corporation, and conditions for the measurement are 900 V-20 mA and a measurement diameter of 4 mmϕ. The measurement is performed at any 10 points for one material, and an average of the measurement at the 10 points is taken as a measurement value of the material. If oil or dirt adheres to a surface of the material, the measurement is performed after degreasing the oil or the dirt with an organic solvent.

(G) Production Method

Steps for producing the plated steel sheet for hot stamping in the present embodiment include a step of producing a base metal and a step of forming a galvanized layer on a surface of the base metal. The steps will be described below in detail.

[Base Material Producing Step]

In a base material producing step, a base metal of the plated steel sheet for hot stamping is produced. For example, a molten steel having a predetermined chemical composition is produced, and this molten steel is used to produce a slab by a casting process or to produce an ingot by an ingot-making process. Next, the slab or the ingot is subjected to hot rolling, by which the base metal (hot-rolled sheet) is obtained.

The hot-rolled sheet may be subjected to pickling, the pickled hot-rolled sheet is subjected to cold rolling, and the resultant cold-rolled sheet may be used as the base metal. Further, the pickled hot-rolled sheet or the pickled cold-rolled sheet may be annealed, and the resultant hot-rolled annealed steel sheet or the cold-rolled annealed steel sheet may be used as the base metal.

[Plating Step]

In a plating step, a galvanized layer is formed on a surface of the base metal, by which the plated steel sheet for hot stamping is produced. The galvanized layer can be formed by performing, for example, a hot-dip galvanizing process.

For example, an example of formation of the galvanized layer by the hot-dip galvanizing process is as follows. That is, the base metal is immersed in a hot-dip galvanizing bath including Zn, Al, and impurities, by which the galvanized layer is caused to attach to the surface of the base metal. A chemical composition of the hot-dip galvanizing bath is constituted mainly by Zn. Specifically, a content of Zn in the hot-dip galvanizing bath is 90 mass % or more. A content of Al in the hot-dip galvanizing bath is preferably 0.05 to 1.00%, more preferably 0.10 to 0.50%, still more preferably 0.12 to 0.30%. The hot-dip galvanizing bath may additionally contain Mg, Pb, Si, and the like, the total content of which is, however, preferably 10 mass % or less.

Next, the base metal with the galvanized layer adhered thereto is drawn up from the plating bath. After being drawn up from the plating bath, the steel sheet is subjected to gas wiping, in which gas is blown on a surface of the plated steel sheet, by which a thickness of the galvanized layer is controlled.

At this time, the blowing of gas causes a new surface to appear on the surface of the galvanized layer, and from this moment, oxidation of a surface of the plating begins, forming a new oxide layer. After the gas wiping, alloying heat treatment described later is performed; in this regard, the present inventors found that optimization of conditions for cooling and heating performed from the gas wiping to the alloying heat treatment is effective at controlling the oxide layer on the surface of the plating, and by extension at preventing a cobweb-like pattern from appearing after hot stamping performed thereafter. More specifically, the present inventors found that it is important to optimize a temperature and a flow rate of the gas in the wiping so as not to cause the plating to solidify during a period from the drawing up from the plating bath until performing the alloying heat treatment.

In general, a temperature of the hot-dip galvanizing bath is normally from 450 to 470° C. A plating layer of a steel sheet immediately after being plated is at almost the same temperature as that of the plating bath and is in a melted state. The plating layer is thereafter cooled gradually; in particular, when the blown gas is at a lower temperature and at a higher flow rate, the temperature of the plating layer rapidly drops. A solidification temperature of zinc plating is about 419° C.; therefore, when a temperature of a plating film becomes at or below the solidification temperature, the plating is rapidly solidified.

It is clarified that, when the plating is in the melted state, the oxide layer formed on the surface of the galvanized layer is relatively soft, whereas when the plating is solidified, the oxide layer on the surface of the galvanized layer becomes highly solid, and a Zn/Al density becomes low, which tends to cause a cobweb-like pattern to appear in hot stamping performed thereafter.

Accordingly, the temperature and the flow rate of the gas in the wiping are adjusted as appropriate so that the surface temperature of the galvanized layer does not drop to 419° C. or less during the period from the drawing up from the plating bath until performing alloying heat treatment.

After the gas wiping, the oxide layer on the surface of the plating grows momently, and thus the oxide layer is formed solidly if a time taken from the gas wiping until a maximum temperature in the alloying heat treatment is reached is more than 30 s; therefore, the time is desirably set to 30 s or less, more desirably 20 s or less, still more desirably 15 s or less.

Although air, nitrogen, or the like is used for the gas wiping, it is desirable to blow a gas in which a density of oxygen is lowered as much as possible from a viewpoint of preventing oxidation. Even when air is used as the gas used for the gas wiping, oxidation can be minimized in some cases depending on a heating pattern from the gas wiping until heating performed thereafter; however, it is effective to use nitrogen gas or an air having a high nitrogen partial pressure in which an oxygen partial pressure is controlled to desirably 15% or less, more desirably 10% or less.

Thereafter, the alloying heat treatment for forming the galvannealed layer is performed. Conditions for the alloying heat treatment are not limited to particular conditions; however, a heating temperature is desirably set to 440 to 600° C. or 460 to 550° C., and a heating duration is adjusted in accordance with the heating temperature, desirably to 1 to 30 s, 1 to 15 s, 1 to 10 s, or 1 to 5 s.

The present invention will be described below more specifically with reference to examples, but the present invention is not limited to these examples.

EXAMPLE

A cold-rolled steel sheet having a thickness of 1.0 mm and a chemical composition including, in mass %, C: 0.21%, Si: 0.2%, Mn: 2.0%, P: 0.01%, S: 0.007%, Cr: 0.2%, Ti: 0.02%, and B: 0.003%, with the balance being Fe and impurities, was annealed through a continuous galvanizing line and subsequently plated under conditions shown in Table 1. The cold-rolled steel sheet was then subjected to the alloying heat treatment under conditions shown in Table 1 to be produced into a plated steel sheet.

Note that, after the steel sheet was drawn up from the plating bath, conditions for the gas wiping were optimized so as not to solidify the plating layer. For the conditions for the gas wiping shown in Table 1, a case where the solidification of the plating layer did not occur was rated as ◯, and a case where the solidification occurred was rated as x. For all examples, a time taken from the gas wiping until a maximum temperature in the alloy heating process was reached was set to 10 s, and in the gas for the gas wiping, a density of oxygen was 15%, with the balance being nitrogen. Further, a composition of the plating bath was such that a density of Al: 0.13 mass %, with the balance: Zn, and the temperature of the plating bath was set to 460° C.

TABLE 1

| Test No. | Proportion of solidified zinc layer (%) | Fe content (mass %) | Oxide layer Zn/Al | Oxide layer thickness (μm) | Weight per square meter of plating (g/m$^2$) | Gas wiping conditions | Heating temperature (° C.) | Heating duration (s) | Cobweb-like defect | Corrosion resistance | |
|---|---|---|---|---|---|---|---|---|---|---|---|
| 1 | 98 | 0.2 | 2.3 | 1.6 | 90 | ◯ | — | 0 | F | A | Comparative example |
| 2 | 95 | 0.4 | 2.5 | 1.2 | 90 | ◯ | 480 | 5 | C | A | Inventive example |
| 3 | 94 | 0.5 | 3.4 | 0.9 | 90 | ◯ | 500 | 3 | B | A | Inventive example |
| 4 | 95 | 0.4 | 4.1 | 0.7 | 90 | ◯ | 520 | 2 | B | A | Inventive example |
| 5 | 93 | 0.6 | 5.3 | 0.3 | 99 | ◯ | 540 | 1 | B | A | Inventive example |
| 6 | 91 | 0.7 | 2.7 | 0.8 | 90 | ◯ | 480 | 7 | C | A | Inventive example |
| 7 | 90 | 0.8 | 3.7 | 0.6 | 90 | ◯ | 500 | 5 | B | A | Inventive example |
| 8 | 89 | 0.9 | 4.0 | 0.2 | 90 | ◯ | 520 | 3 | B | A | Inventive example |
| 9 | 81 | 1.5 | 3.7 | 0.6 | 90 | ◯ | 500 | 9 | B | A | Inventive example |
| 10 | 70 | 2.4 | 3.8 | 0.5 | 90 | ◯ | 500 | 13 | B | A | Inventive example |
| 11 | 61 | 3.1 | 3.9 | 0.4 | 90 | ◯ | 500 | 17 | B | A | Inventive example |
| 12 | 49 | 4.0 | 2.8 | 0.7 | 90 | ◯ | 480 | 25 | C | A | Inventive example |
| 13 | 50 | 3.9 | 3.9 | 0.4 | 90 | ◯ | 500 | 20 | B | A | Inventive example |
| 14 | 51 | 3.8 | 4.4 | 0.2 | 90 | ◯ | 520 | 15 | B | A | Inventive example |
| 15 | 50 | 3.9 | 4.9 | 0.1 | 90 | ◯ | 540 | 10 | A | A | Inventive example |
| 16 | 52 | 3.7 | 6.4 | 0.2 | 60 | ◯ | 500 | 10 | A | B | Inventive example |
| 17 | 49 | 4.0 | 4.2 | 0.3 | 70 | ◯ | 500 | 15 | B | A | Inventive example |
| 18 | 50 | 3.5 | 3.3 | 0.5 | 140 | ◯ | 500 | 30 | B | A | Inventive example |
| 19 | 48 | 4.0 | 2.7 | 0.6 | 160 | ◯ | 500 | 40 | C | A | Inventive example |
| 20 | 50 | 3.9 | 2.5 | 1.3 | 90 | ◯ | 500 | 10 | C | A | Inventive example |
| 21 | 40 | 4.6 | 3.9 | 0.4 | 90 | ◯ | 500 | 22 | B | A | Inventive example |
| 22 | 30 | 5.4 | 3.9 | 0.3 | 90 | ◯ | 500 | 25 | B | A | Inventive example |
| 23 | 21 | 6.0 | 3.8 | 0.3 | 90 | ◯ | 500 | 27 | B | A | Inventive example |
| 24 | 12 | 6.7 | 2.9 | 0.4 | 90 | ◯ | 480 | 40 | C | A | Inventive example |
| 25 | 10 | 6.8 | 3.8 | 0.3 | 90 | ◯ | 500 | 30 | B | A | Inventive example |
| 26 | 11 | 6.7 | 4.5 | 0.3 | 90 | ◯ | 520 | 22 | B | A | Inventive example |
| 27 | 10 | 6.8 | 5.3 | 0.2 | 90 | ◯ | 540 | 15 | A | A | Inventive example |
| 28 | 4 | 7.2 | 6.5 | 0.2 | 90 | ◯ | 480 | 50 | B | F | Comparative example |
| 29 | 5 | 7.2 | 6.9 | 0.2 | 90 | ◯ | 500 | 40 | A | F | Comparative example |
| 30 | 4 | 7.2 | 7.2 | 0.2 | 90 | ◯ | 520 | 30 | A | F | Comparative example |
| 31 | 5 | 7.2 | 7.4 | 0.1 | 90 | ◯ | 540 | 20 | A | F | Comparative example |
| 32 | 0 | 8.2 | 6.6 | 0.2 | 90 | ◯ | 480 | 70 | A | F | Comparative example |
| 33 | 0 | 8.0 | 6.9 | 0.1 | 90 | ◯ | 500 | 60 | A | F | Comparative example |
| 34 | 0 | 8.5 | 7.0 | 0.1 | 90 | ◯ | 520 | 50 | A: | F | Comparative example |
| 35 | 0 | 9.0 | 7.5 | 0.1 | 90 | ◯ | 540 | 40 | A | F | Comparative example |

A chemical composition of the galvanized layer of the resultant plated steel sheet was measured by the method described above. In addition, a thickness of the oxide layer of the resultant plated sheet was measured by the GDS. Results of these measurements are shown together in Table 1. As shown in Table 1, in Test No. 1, a proportion of its solidified zinc layer was 98%, which is equivalent to a normal galvanized steel sheet that is not alloyed. In Test Nos. 32 to 35, their galvanized layers were so completely alloyed that proportions of the solidified zinc layers were 0%, which is equivalent to a normal galvannealed steel sheet.

Thereafter, a plated steel sheet in each of test examples was cut into pieces having a 100 mm square size, which were heated to 900° C. in an electric furnace with an air atmosphere, heated for 3 minutes therein, then taken out, and immediately placed in a flat press machine with water cooling pipes built therein to be subjected to rapid cooling, by which a hot-stamped high-strength material was obtained. A surface of the material was observed to evaluate whether a cobweb-like defect was present or not. As criteria of the evaluation, a case where a cobweb-like defect was seen very clearly on the surface of the material was rated as F, a case where a cobweb-like defect was seen thinly and seen even after chemical conversion and electrodeposition was rated as C, a case where a cobweb-like defect was slightly seen but not seen after the chemical conversion and electrodeposition was rated as B, and a case where no cobweb-like defect was seen even before the chemical conversion and electrodeposition was rated as A.

Further, corrosion resistance was evaluated through a coating adhesiveness test by immersion in warm salt water. A specimen material after a hot stamping heating was subjected to zinc phosphate treatment with PBL-3080 from NIHON PERKERIZING Co., LTD under normal chemical treatment conditions, then subjected to electrodeposition coating with electrodeposition paint GT-10 from KANSAI PAINT CO., LTD. by slope energization at a voltage of 200 V, and subjected to baking finish at a baking temperature of 150° C. for 20 minutes. A thickness of the coating was 20 µm. The resultant sample was immersed in 5% NaCl aqueous solution at 50° C. for 500 hours, then a tape peeling test was performed on its coating; a case where a peeling of 5% or more occurred was rated as F, a case where a peeling of 1% or more to less than 5% occurred was rated as B, and a case where a peeling of less than 1% occurred was rated as A.

Results of the evaluations are shown together in Table 1. As seen from results shown in Table 1, in cases where specifications of the present invention were satisfied, a cobweb-like defect was prevented, and corrosion resistance was excellent. In particular, in examples where values of Zn/Al in the oxide layer were 3.0 to 6.0, no or almost no cobweb-like defect was observed.

INDUSTRIAL APPLICABILITY

According to the present invention, it is possible to provide a plated steel sheet for hot stamping on which a cobweb-like surface defect can be prevented in a case where Al-containing Zn plating is used.

The invention claimed is:

1. A plated steel sheet for hot stamping comprising a base metal steel sheet and a galvanized layer as a plated layer that is formed on a surface of the base metal steel sheet, wherein
   the galvanized layer includes a galvannealed layer, a solidified zinc layer, and an oxide layer containing Al, in this order from the base metal steel sheet,
   a proportion of a content of Zn ($g/m^2$) in the solidified zinc layer to a content of Zn ($g/m^2$) in the galvanized layer is 10 to 95%, and
   a chemical composition of the oxide layer satisfies Formula (i) shown below, $$3.0 \leq Zn/Al \leq 6.0 \tag{i}$$

where Zn and Al are contents of Zn and Al ($g/m^2$) contained in the oxide layer, respectively.

2. The plated steel sheet for hot stamping according to claim 1, wherein an average thickness of the oxide layer is 1.0 µm or less.

3. The plated steel sheet for hot stamping according to claim 2, wherein the content of Zn in the galvanized layer is 65 to 150 $g/m^2$.

4. The plated steel sheet for hot stamping according to claim 3, wherein a content of Fe in the galvanized layer is, in mass %, less than 7%.

5. The plated steel sheet for hot stamping according to claim 2, wherein a content of Fe in the galvanized layer is, in mass %, less than 7%.

6. The plated steel sheet for hot stamping according to claim 1, wherein the content of Zn in the galvanized layer is 65 to 150 $g/m^2$.

7. The plated steel sheet for hot stamping according to claim 6, wherein a content of Fe in the galvanized layer is, in mass %, less than 7%.

8. The plated steel sheet for hot stamping according to claim 1, wherein a content of Fe in the galvanized layer is, in mass %, less than 7%.

* * * * *